UNITED STATES PATENT OFFICE.

WILLIAM S. SHAW, OF BOYNE CITY, MICHIGAN.

PROCESS OF PREPARING AND PACKING TANBARK.

1,146,963. Specification of Letters Patent. Patented July 20, 1915.

No Drawing. Application filed September 5, 1913. Serial No. 788,223.

*To all whom it may concern:*

Be it known that I, WILLIAM S. SHAW, a citizen of the United States, residing at Boyne City, in the county of Charlevoix and State of Michigan, have invented a certain new and useful Process of Preparing and Packing Tanbark, of which the following is a specification.

This invention relates to an improved process of preparing tan bark, and it has for its salient objects to provide a method whereby tan bark may be prepared for marketing and for use in a highly expeditious and economical manner; to provide a process whereby the quality of the tan bark is improved as compared with the products heretofore made by the usual methods; to provide a process by which the bark is immediately converted into stable and marketable condition, in which condition it may be kept indefinitely without deterioration; to provide a process which results in converting the tan bark into condition for extraction without further grinding or comminuting; to provide a process in which the material is very uniformly reduced to the desired degree of fineness while kept unusually free from finely pulverized dust, etc.; to provide a process in which the full strength and efficiency of the tank bark is preserved without deterioration; and in general, to provide an improved process of the general character referred to.

A further object of the invention is to provide as a new article of manufacture a bale or block of tan bark which is characterized by its stability, its density, its weather-proof qualities and the facility with which it may be disintegrated in readiness for extraction.

To the above ends the invention consists in the matters hereinafter described, and more particularly pointed out in the appended claims.

The most common practice of harvesting and preparing tan bark is to fell the trees, cut the trunk into lengths, and then with ax and spud remove the tan bark in sheets; these sheets being usually of the length of the trunk section and of such width as can be readily peeled off with the spud. The sheets of bark thus taken off are piled up or corded with sufficient interspaces to permit the bark to dry out, and then allowed to weather-cure. Commonly the piles of tan bark are "topped out" or so piled up shingle or thatch fashion as to shed water, and thus protect the pile from rain and snow. This process has the advantage of simplicity and capability of being carried out by any ordinary woodman with the simple tools comprising an ax and spud. However, the removal of the bark from the tree trunks in this manner is slow and laborious, and can only be done during a period of about four months of each year, while the sap is running. In the case of trees which are dead before being felled, it is practically impossible to peel off the tan bark in the manner described. Moreover, it requires about a year for the bark to dry out when piled as usual and by reason of being subject to the weather, deteriorates to a very appreciable extent, this being especially true of the exposed parts of the pile, such as the top, the sides and the ends. Again, it is necessary that the bark be finely shredded or ground before the tannin is extracted therefrom, and the grinding of the bark after it has been dried very thoroughly results in the production of an undue percentage of very fine, dust-like material, which not only interferes with the ready circulation of the extracting liquor through the mass but tends to make the liquor itself muddy and unsatisfactory. There are other objections to the old-fashioned method of treatment which need not be mentioned.

It has been proposed to remove the bark from tree bodies by machinery, but so far as I am aware the machines have invariably operated to remove the bark in chips or chunks and have not been of such character as to be capable of removing and by the same operation uniformly comminuting the bark to that degree of fineness necessary to make it ready for practical extraction. Again, I am not aware that it has ever been proposed to remove the bark and immediately comminute it and dry it artificially so that it would be rendered stable and in readiness for indefinite preservation, immediately.

In carrying out my invention, in so far as the process is concerned, the logs from which the tan bark is to be taken are cut into suitable lengths so that they can be placed upon a machine which will bring all parts of their bark covered surface under the action of suitable bark-removing cutters or crushers; the bark-removing operation being a progressive one. That is to say, one suitable machine for so removing the bark is that shown in application Serial No. 803,896 filed Dec. 1, 1913. This machine is in the nature of a large, powerful lathe in which the log to be peeled is chucked and turned upon its own axis, and a series of knives somewhat resembling planer cutters and similarly rotated at high speed are caused to act upon the log in such manner that as the log rotates slowly the cutters remove the bark progressively by being fed longitudinally of the log a distance approximately equal to the width of cut during each revolution of the log. An important peculiarity of the machine resides in the character of the cutters for removing the bark; these cutters being arranged in the same general manner as planer-head cutters but having cutting edges of such form that the bark, instead of being cut cleanly chisel-fashion, is rasped off and at the same time crushed. This is accomplished by making the acting edges of the cutters thick and angular, the converging sides of the cutter edges being disposed more or less nearly in right-angled relation to each other. The action of the cutter on the log is, therefore, more in the nature of a shearing than true cutting action. The speed of rotation of the cutter-heads is adjusted relatively to the width of cut or longitudinal traverse of the cutters and to the rotative speed of the log so as to secure the desired result. In this manner the bark is removed in the form of rather finely crushed but not pulverized shreds or particles, and the grain of the bark is very effectually broken up so that the mass as a whole will be readily permeable to water and sufficiently fine so that the tannin may be extracted rapidly without further crushing or pulverizing of the tan bark. Ordinarily the bark when thus removed from the log will contain considerable moisture, and this will be especially true if the logs be green and charged with sap.

The second step of the process consists in artificially drying the comminuted tan bark to such degree of dryness that it can be compacted into a dense bale without danger of subsequent fermentation or deterioration. In artificially drying the comminuted tan bark I prefer to use a drier of the well-known Cummer type, in which the material is passed progressively through a tubular oven, and while so progressing through the oven is tumbled and subjected to the direct action of hot air. The operation of drying in this manner is a continuous one, and the drying effect may be regulated to a nicety, since the rate at which the material is fed into the drier may be regulated, the rate of progress of the material through the drier may be determined by regulating the speed of rotation of the drier, and the degree of dryness which the material shall have when it emerges from the drier may be regulated by adjusting the length of time required to pass the material through the drier and by regulating the heat of the air admitted to different parts of the drier during progress of the material therethrough.

In conducting the drying operation the drier is so controlled as to avoid scorching or burning the comminuted bark, and the material is preferably dried to a condition about equal to that of normal atmospheric dryness, i. e., so that the material will contain 10% or less of moisture. The material having been thus uniformly dried, is next transferred to a baling press where it is compacted into a dense block or bale. An ordinary baling press, such as is suitable for baling hay and analogous materials, is suitable for this purpose, and the manner of carrying out the baling step is obvious. It should be understood, of course, that since bark is more finely divided than such material as hay, the baling wires must of necessity be correspondingly closer together and greater in number. It is preferable to tie the bale with baling wires practically the same as a bale of hay is tied; it being understood that the bale will be compacted to a very dense condition, say to such degree of density that it will weigh approximately 40 to 50 pounds per cubic foot. The density and weight will, of course, vary with different kinds of tan bark, but the object is to compact the bale so densely that there will be no permeating circulation of air through the bale. As a result of thus densifying the product, the bales are rendered substantially impervious to air or moisture, and may be handled and transported and stored indefinitely without deterioration.

When the tanner comes to use the tan bark, the bale is readily broken up and the bark is found in ideal condition for extraction, since it contains the full content of tannin which it contained when originally taken from the tree; the bark is fresh and unchanged chemically since it has not been exposed to the weather or moisture, and the mass is very free from dust and powder, since it was removed from the tree in uniformly comminuted but not powdered condition, and has not been subjected to any treatment by which it would be subsequently reduced more finely or pulverized.

I claim as my invention:

1. The herein described process of manufacturing tan bark, which consists in first removing the bark from the wood by a combined tearing and shredding operation whereby the bark is comminuted into condition for extracting, then artificially drying said comminuted bark to a condition of approximately normal atmospheric dryness, then while in this dry condition compacting the bark into dense, substantially waterproof bales.

2. The herein described process of manufacturing tan bark, which consists in progressively cutting off the bark by means of high-speed blunt-edged tools whereby the bark is simultaneously torn off and shredded but not powdered to any considerable degree, then artificially drying the comminuted bark to a condition of permanent stability and then compacting the material into dense blocks or bales densified until they are substantially weatherproof.

3. The improved process of manufacturing tan bark, which consists in progressively removing the bark from the wood and simultaneously reducing the same into material which is finely shredded but not powdered to any extent, then progressively drying the bark by the direct action of hot air to a condition in which it contains not to exceed 10% moisture, then compressing the dried material into blocks or bales of a density and solidity greater than the bark in its original natural condition, and binding said blocks or bales so that they may be handled as shipping commodities without substantial disintegration.

4. The improved process of preparing tan bark for shipment to the consumer, which consists in performing the operation of simultaneously removing the bark from the log, while at the same time reducing the same into a shredded condition, but not powdered to any great extent, then progressively drying the comminuted bark by the direct action of hot air to a condition in which it contains a comparatively small percentage of its original moisture, then compressing the dried comminuted material under heavy pressure into blocks or bales of a density and solidity greater than the bark in its original natural condition, and binding said blocks or bales so that they may be handled as shipping commodities without substantial disintegration.

WILLIAM S. SHAW.

Witnesses:
 ALBERT H. GRAVES,
 EMILIE ROSE.

Copies of this patent may be obtained for five cents each, by addressing the "Commissioner of Patents, Washington, D. C."